May 24, 1927.

F. HEDLEY ET AL

1,629,621

CHANGE MAKING AND EJECTING MECHANISM

Filed Aug. 8, 1923      7 Sheets-Sheet 1

May 24, 1927.　　　　　　　　　　　　　　　1,629,621
F. HEDLEY ET AL
CHANGE MAKING AND EJECTING MECHANISM
Filed Aug. 8, 1923　　　　7 Sheets-Sheet 3

May 24, 1927.

F. HEDLEY ET AL 1,629,621

CHANGE MAKING AND EJECTING MECHANISM

Filed Aug. 8, 1923     7 Sheets-Sheet 4

Fig.6

INVENTORS
Frank Hedley
James S. Doyle
BY
Darby & Darby
ATTORNEYS

May 24, 1927.   1,629,621
F. HEDLEY ET AL
CHANGE MAKING AND EJECTING MECHANISM
Filed Aug. 8, 1923   7 Sheets-Sheet 6

INVENTORS
Frank Hedley
and
James S. Doyle
BY
Darby & Darby
ATTORNEYS

Patented May 24, 1927.

1,629,621

UNITED STATES PATENT OFFICE.

FRANK HEDLEY, OF YONKERS, AND JAMES S. DOYLE, OF MOUNT VERNON, NEW YORK.

CHANGE MAKING AND EJECTING MECHANISM.

Application filed August 8, 1923. Serial No. 656,416.

This invention relates to change making and ejecting mechanism.

The object of the invention is to provide a mechanism which is simple in structure, economical to construct and speedy and efficient in operation, for making change of coins of one denomination into coins of lower denomination and ejecting the required change.

A further object is to provide a change making and ejecting mechanism wherein the control thereof is effected conjointly by the deposit of the coin to be changed and by manual manipulation.

A further object is to provide a change making apparatus wherein the change making combinations for the various coins to be changed are controlled by the deposited coins, while the ejection of the change is controlled manually.

A further object is to provide a change making mechanism adapted to deliver change for a plurality of different coins, but wherein the deposit of one coin to be changed automatically locks the apparatus against the reception of another coin until the coin first deposited is disposed of.

A further object is to provide a change making and ejecting mechanism, wherein each coin deposited controls the corresponding change ejecting devices according to the denomination of the deposited coin, and wherein the operation of the ejecting mechanism after being properly set or selected by a deposited coin is controlled from a distant point.

A further object is to provide means in a change making mechanism of the nature referred to, for ejecting or eliminating a spurious coin, slug or the like, which may have been deposited, without setting or selecting change ejecting devices, and without operating the latter.

A further object is to provide means in a mechanism of the nature referred to whereby a deposited coin is rendered visible to an operator or attendant at the station from which the change ejector devices are controlled.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

In the accompanying drawings:—

Fig. 7 is a view in horizontal section on the line 7, 7, Fig. 4, looking in the direction of the arrows.

The same part is designated by the same reference numeral wherever it occurs throughout the several views.

Among the serious practical difficulties and objections encountered in the use of change making and ejecting apparatus, and coin controlled vending and ejecting devices generally, is the necessity, in the case of change making apparatus, to employ an attendant who receives the coin to be changed, and who positions and actuates the change ejecting devices. This is necessary in order to avoid loss due to the use of spurious or improper coins, slugs or the like. In the case of vending and ejecting devices generally it is usually necessary that a coin of the exact denomination required be deposited, and here, too, the detection, rejection and elimination of spurious or improper coins, slugs or the like, is attended with difficulties and is not always satisfactorily accomplished. In many places where change making and ejecting mechanism would be of great convenience and service it is not desirable or practical to employ an attendant to receive the coin to be changed and to make and deliver the required change, or to operate mechanically actuated apparatus to effect the delivery of the required change. For example, in the operation of street, subway, elevated and other passenger cars and vehicles, and the collection of fares in connection therewith, it would increase the cost of operation and cause undesirable delays in schedules which modern necessities of rapid transit forbid. Besides, such a method offers opportunity to unscrupulous employees to exercise their dishonesty at the expense of their employers, or of the persons seeking change. To avoid these and other objections, we propose, in accordance with our invention, to provide an apparatus which will relieve the conductor or other person in charge of the necessity for handling any of the money, whether in the collection of fares, or transfers, or in making change for passengers.

In the case of coin controlled vending machines generally, it is not always the case that a person has the exact denomination of coin to be deposited, and it frequently occurs that the delay and annoyance incident to procuring change so as to obtain a coin of the required denomination for use in the machine, leads to a failure of the person to use the machine, and this results in the loss of a sale.

It is among the special purposes of our present invention to provide a change making and ejecting apparatus, which is simple and efficient for use on street railway, subway, elevated and other passenger carrying cars or vehicles, and generally wherever change making or coin controlled ejecting apparatus is desirable, and according to our invention the passenger or other person desiring to receive the change or other article, deposits by his own hand his own coin into the apparatus and receives direct from the mechanism the desired and correct change, in the case of a change making apparatus, or the article to be delivered together with the correct change, in the case of a vending and ejecting mechanism. We also propose, in accordance with our invention, and in order to avoid loss by reason of the deposit of spurious or improper coins, slugs or the like, to place control of the operation of the mechanism, after a coin has been deposited, in charge of the conductor or other attendant, who may be located at any desired point or station near to or removed from the location of the change making mechanism. And we also propose, under the same conditions of deposit and control, to provide means whereby, in a vending machine, for example, a coin of any denomination higher than the one required by the machine may be deposited by a prospective purchaser for the article to be vended, and such article together with the correct amount of change to be returned from the deposited coin will be ejected and delivered to the one initially depositing the coin. In other words, we propose to provide a change making and ejecting mechanism wherein the handling of the money, whether it be the deposited coin or the ejected change, is entirely in the hands of the person desiring the change, while the control of the operation of the apparatus is in the hands of an attendant, whether located at the apparatus or at a point or station removed therefrom.

We also propose, in accordance with our invention, to employ the deposited coin to effect the proper selection of the corresponding change making and ejecting combination of devices according to the denomination of the particular coin to be deposited, and we propose to employ means which are controllable from any desired or convenient station, for effecting the operation of the change making and ejecting mechanism, after the proper combination has been selected by the deposited coin. In other words, the operation of the apparatus is effected conjointly by the deposit of a coin, which makes the selection of the corresponding change ejecting combination, and manually by an attendant by whom the actuation of the selected combination is controlled.

In order to provide against loss through the deposit of spurious or improper coins, slugs or the like, we also propose to provide means to retain each deposited coin in position to be visible to an attendant, whether stationed adjacent to or at a point or station remote from the apparatus, whereby such attendant, who has control of the actuation of the ejector mechanism, may ascertain the character of the deposited coin before effecting actuation of the ejector mechanism, and we place under the control of such attendant means to trip the coin retaining devices to release a deposited spurious coin or slug, and also means to deflect the released spurious coin or slug into a return chute without effecting an actuation of the ejector devices.

In carrying out our invention in one illustrative embodiment, we propose to employ electrically operated devices, the circuits of which are controlled by the deposited coins to close the coin slots against the receipt of another coin until a previously deposited coin has been disposed of, either by its return, if spurious or otherwise objectionable, or by the ejection of the required change. We also propose to employ electrically operated devices, the circuits of which are under the control of an attendant, for returning a spurious or improper coin or slug, and electrically operated devices the control of the circuits of which is conjointly by the deposited coin and by an attendant to actuate the coin ejector mechanism and to release the coin retaining devices. We also propose to employ ejector devices in sets or groups respectively corresponding to the denominations of the various coins for which the apparatus is adapted. For example, in the apparatus shown, provision is made for effecting change for four different coins, namely a fifty cent piece, a twenty-five cent piece, a ten cent piece and a five cent piece, and, correspondingly, four sets or groups of ejector devices are employed respectively designed to deliver the required change for the respective coins to be deposited. In the case of the fifty cent piece, the corresponding group or set of ejector devices consists of four ejectors designed to eject from suitable racks, respectively, a twenty-five cent piece, two dimes and a five cent piece, or a twenty-five cent piece, one dime and three five cent pieces, or any other desired combination. In the case of a twenty-five cent piece, the ejector set or group consists of three ejectors designed to eject two dimes and a five cent piece, or any other desired combination. In the case of a ten cent piece, the ejector group consist of two ejectors designed to eject two five cent pieces, and in case of a five cent piece, three ejectors are included in the corresponding set or group, two designed to eject two pennies each and the third designed to eject a single penny. In the case of a vending machine, one of the ejectors of each group will eject the article to be vended and the others of the same group will eject the correct change. In like manner, in the case where the apparatus is employed on a street car in the collection of fares, or the sale of transfers, the ejectors may be arranged to eject only the required change and retain the fare, or to eject only the required change and a transfer or token.

Various structures may be devised for carrying out these and other objects, purposes and operations of our invention. While, therefore, we have shown, and will now describe, one illustrative embodiment which we have found suitable for our purposes, we wish it to be understood that our invention in its broadest scope as defined in the claims, is not to be limited or restricted to the specific structure and arrangement shown.

Figure 3:
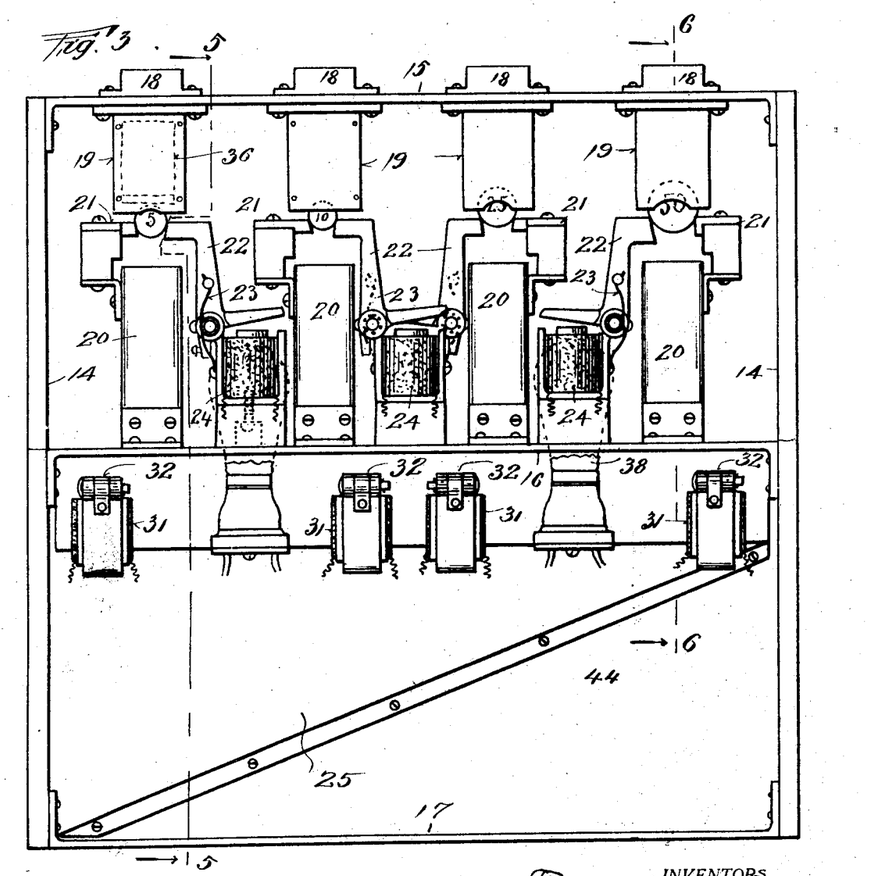
Fig. 3 is a view in side elevation, the casing being removed, of the mechanism concerned in receiving and tripping the deposited coins.
Figure 4:
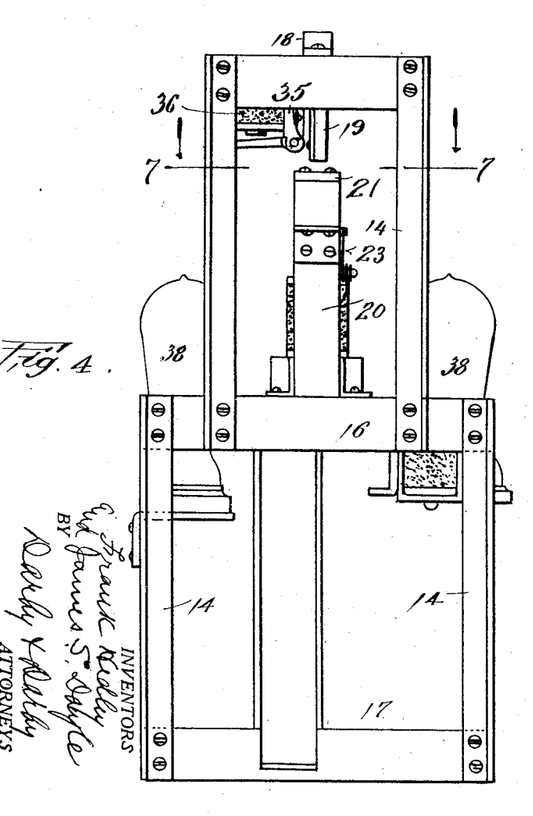
Fig. 4 is a view in end elevation of the structure shown in Fig. 3.
Figure 5:
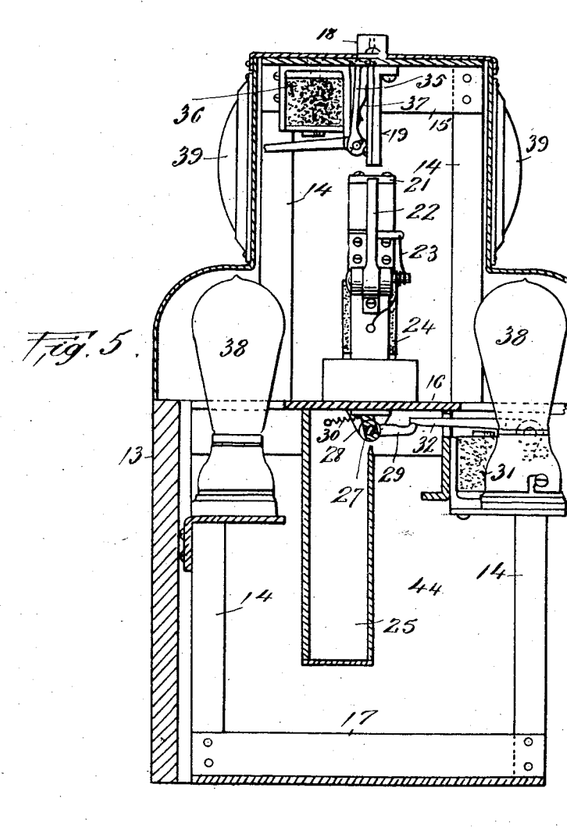
Fig. 5 is a view in vertical section on the line 5, 5, Fig. 3, looking in the direction of the arrows.

In the drawings, reference numeral 13 designates a casing within which the various working parts are mounted, including the coin receiving and retaining devices, the trip mechanism therefor, and the various other associated parts. The upper part of the casing contains the coin receiving and tripping devices, the baffle member for directing proper coins into a receiving compartment therefor, and for eliminating and directing spurious coins, slugs and the like into a return chute. Mounted within this part of the casing is a suitable frame consisting of upright posts 14 and cross connecting members 15, 16, 17. Carried by the upper cross member 15, are the coin receiving slot members 18 and races 19. As many of these receiving slot members and races are provided as is desired to constitute the capacity of the apparatus. In the particular arrangement shown, four sets are employed to accommodate, respectively, a fifty cent piece, a twenty-five cent piece, a ten cent piece and a five cent piece. We do not desire, however, to be limited or restricted in this respect, although the arrangement shown will well answer all ordinary requirements, particularly in the case of a change making machine. The coin receiving slots in the members 18 and 19 vary in size, of course, according to the size of coin they are to receive, and they are disposed in line with chutes 20, which are suitably mounted on the cross member 16 of the frame work. The coin receiving and retaining devices are interposed between the races 19 and the chutes 20, and are designed to receive and form a temporary support for the deposited coins, a set of receiving and retaining devices being associated with each race and chute. Each set of retaining devices consists of a pair of oppositely disposed fingers 21, 22, spaced apart from each other, and the space between which is bridged by the coin when resting thereon as shown in Fig. 3. These retaining fingers are disposed in series in an electric circuit which is closed between them when a coin is deposited and in supported position between them. One of said fingers is grounded, as for example through the framework of the apparatus, or otherwise, while the other is connected to a source of current. In the structure shown, one of said fingers as 21 is fixed while the other, as 22, is pivotally mounted whereby it may be rocked so as to trip and release a coin suspended between the pair and permit the released coin to drop into the chute 20. The pivoted member 22 may be yieldingly maintained, in any convenient manner, in cooperative relation with respect to finger 21, as, for example, by means of a spring 23, and is rocked out of coin support ing position to release the coin, by means of a magnet 24, the circuit of which is controlled conjointly by the deposited coin, and by an attendant, as will be more fully explained hereinafter.

Figure 6:
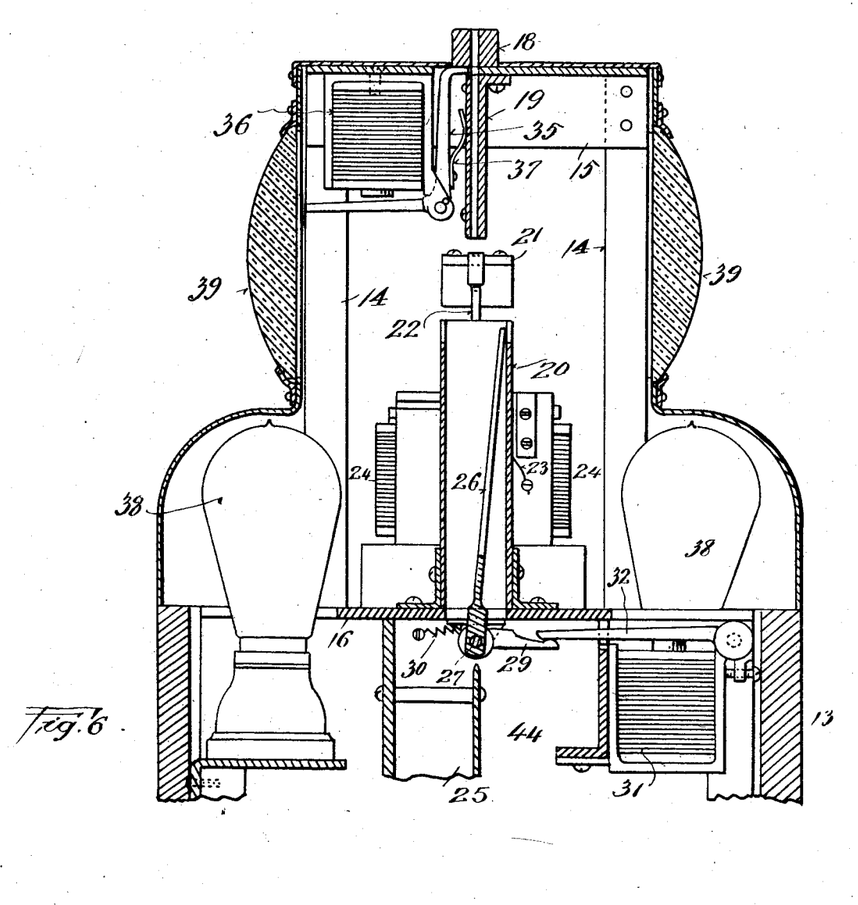
Fig. 6 is a view similar to Fig. 5 on the line 6, 6, Fig. 3, looking in the direction of the arrows.

The chute 20 delivers into a receiving compartment 44, or into a return chute 25, according to the position occupied by a baffle member or plate 26 which is disposed within or otherwise associated with said chute. The baffle member may be normally maintained in position to direct a coin or slug, when released, into either the return chute or into the coin receiving compartment. A spring, indicated at 30, may serve to hold the baffle in one position and a magnet 31 to shift the baffle against the opposing tension of the spring into the other position. Our invention is not to be limited or retricted with respect to whether the magnet or the spring holds the baffle member in the one or the other of said positions. For merely illustrative purposes we have shown the baffle member as carried by a pivot pin 27 which is journaled in brackets 28, fastened to the frame cross member 16 at opposite sides of the chute 20. An arm 29 is connected to this pivot pin to rock the same. A spring 30 serves to normally maintain the baffle member in an initial position to direct the released coin into the receiving receptacle 24. The armature 32 of a magnet 31, by engaging the arm 29 serves to rock the baffle member into the position shown in Fig. 6 whereby a released coin dropped into the chute 20 is directed into the return chute 25, this being the operation in case a spurious or improper coin, slug or the like, is deposited into the apparatus. The circuit of the magnet 31 is under the control of an attendant, as will be more fully explained hereinafter. The throw of the armature 32 may be adjusted in any suitable manner, as, for example, by means of the adjustable set screw 33. The return chute 25 delivers into a cup 34 outside the casing, see Figs. 1 and 2, whence the eliminated coin or slug may be obtained by the depositor.

Interposed between the coin receiving mouth 18 and the race 19 is a stop device designed to cut off communication between said mouth and race after a coin is deposited until the deposited coin has been disposed of, that is, either returned to the depositor, in case of a spurious coin, slug or the like, or is released and deposited in the receiving compartment 44, in case of a proper coin. Any suitable stop device for this purpose may be employed. We have shown a simple arrangement wherein a bell crank lever 35, see Fig. 6, has the end of one arm thereof arranged to be projected across the end of the slot in the coin receiving mouthpiece 18, the other arm of said lever constituting the armature of a magnet 36. A spring 37 normally maintains the stop end of lever 35 retracted from stop position. The circuit of magnet 36 is completed through the coin receiving fingers 21, 22, when a deposited coin bridges the space between them, thereby preventing the deposit of another coin in the same receiving slot until the previously deposited coin has been disposed of.

In order to enable the character of a deposited coin to be readily and easily revealed and ascertained while still retained in position on the retaining fingers 21, 22, and from a distant point, so as to enable an attendant to determine whether to release the deposited coin into the receiving receptacle 44 or into the return chute 25, we place one or more electric lamps 38 within the casing, as a source of light, and we position in the wall of the casing opposite each pair of fingers 21, 22, a magnifying lens 39 whereby the character of the deposited coin may be ascertained by inspection of the magnified image thereof through the lens. If desired, and in order to enable inspection of the deposited coin to be made from points on opposite sides of the apparatus, a magnifying lens is placed on each side of each pair of coin supporting fingers 21, 22.

The change carrying and ejecting devices may be of the usual or any desired structure. We have shown a simple arrangement which we have found suitable for the purpose and which consists of a series of chutes or racks in which the coins of the required denomination to make change for the respective deposited coins are piled or stacked. These chutes or racks are indicated at 40 in Figs. 1, 2, 10 and 11. Through the lower end of each rack operates the end of a push rod or member 41, designed, when actuated, to eject one, two or more of the coins contained therein as the case may be. Each push rod is pivotally mounted intermediate its ends upon an arm 42, which is mounted to rock or swing upon a supporting rod 43. This rod, in the particular structure shown, carries all the arms 42. According to our invention, however, the racks 40 and their associated ejector members 41, are arranged in sets or groups according to the respective denominations of the coins to be changed, as above explained. Consequently, all the arms 42 and push rods or ejectors 41 required for each set or group, are connected to move in unison with each other. This is accomplished by means of brackets or plates 45 to which respectively all the arms 42 of a group or set are connected. The arms 42 are normally held in retracted position by means of springs 46, and each set or group is actuated to effect the ejection of the coins for the change desired, by means of a magnet 47, the armature 48 of which engages a projection or lug 49 on the bracket 45, thereby rocking said arms. In order to maintain the ejector rods 41 in proper position and relation we prefer to form them with overweighted free or rear ends. The ejector ends of these members work through slots or openings at the bases of the chutes or racks 40.

Figure 10:
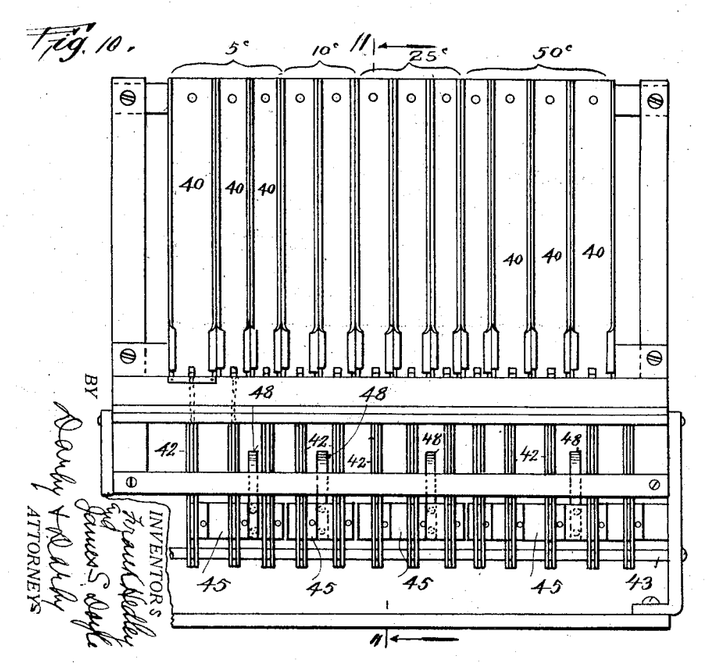
Fig. 10 is a view in elevation of the lower part of the apparatus showing the change carrying and ejecting devices, the casing being removed.
Figure 11:
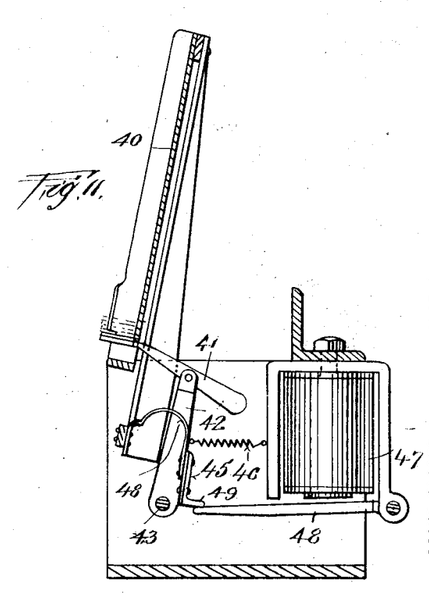
Fig. 11 is a view in vertical section on the line 11, 11, Fig. 10, looking in the direction of the arrows.

When each magnet 47 is energized it not only rocks its associated group or set of ejector members but it also closes the circuit of the coin trip magnet 24. This may be effected in any suitable or convenient manner, as, for instance, by means of a switch device indicated at 48, one member of which is shown in Figs. 1, 10 and 11.

Figure 1:
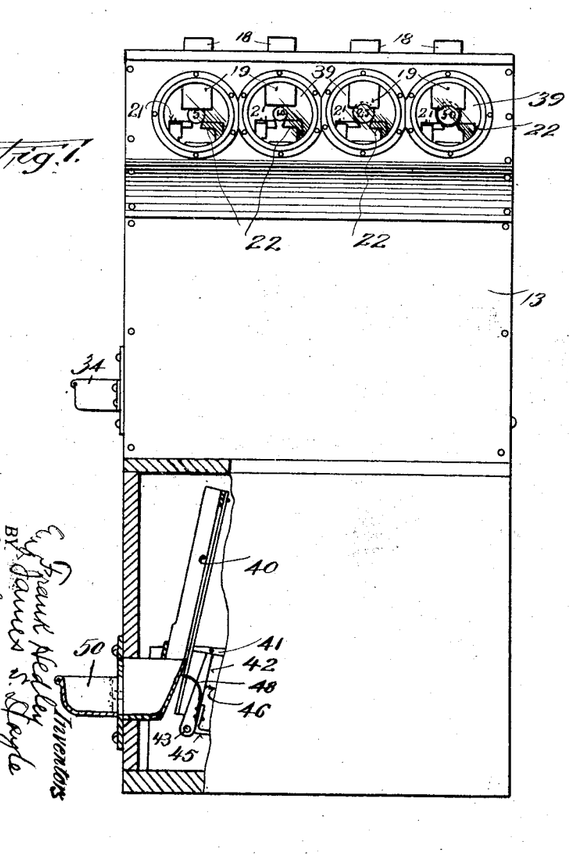
Fig. 1 is a view in side elevation of an apparatus embodying the principles of our invention, parts broken out and parts in vertical section to show a portion of the change ejecting mechanism.
Figures 1, 8, 9:
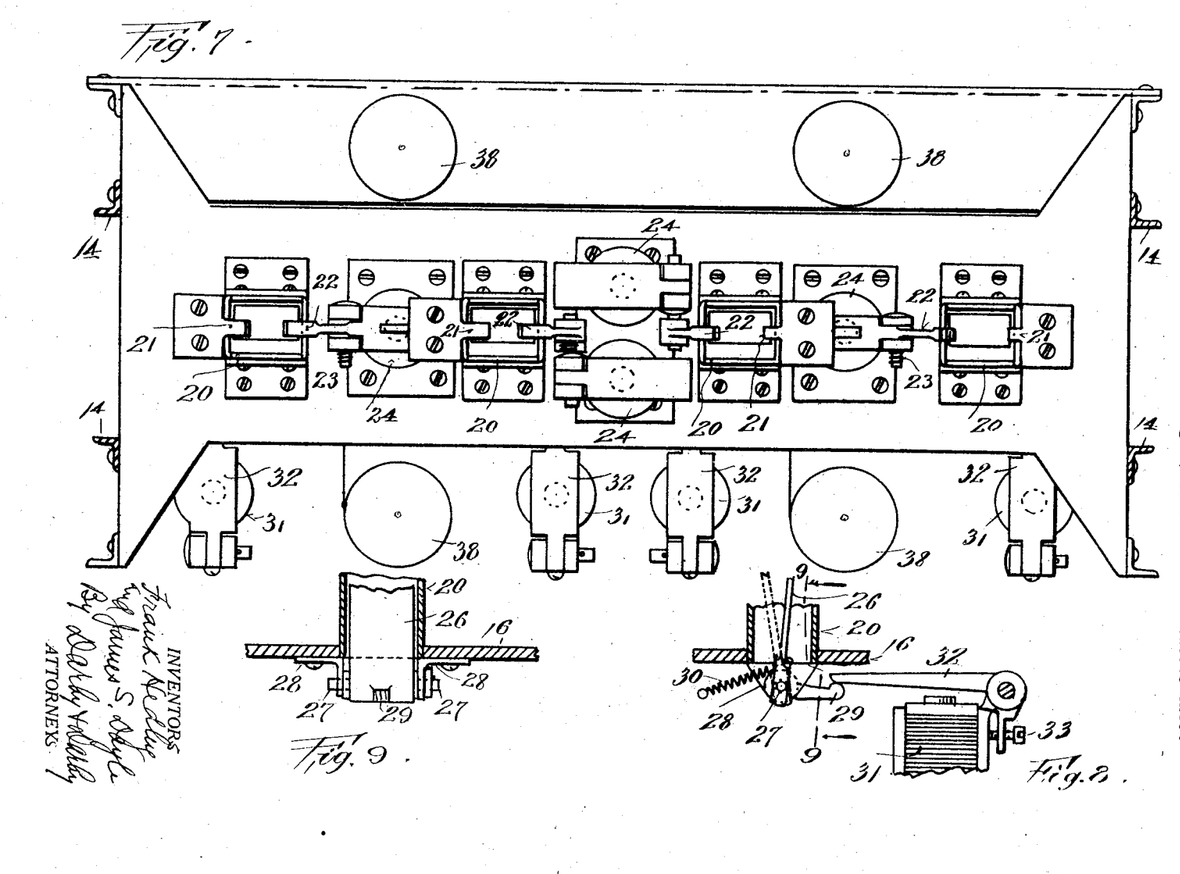
Fig. 8 is a broken detail view in vertical section of the coin diverting baffle plate and its operating devices.
Fig. 9 is a view similar to Fig. 8, on the line 9, 9, Fig. 8.
Figure 2:
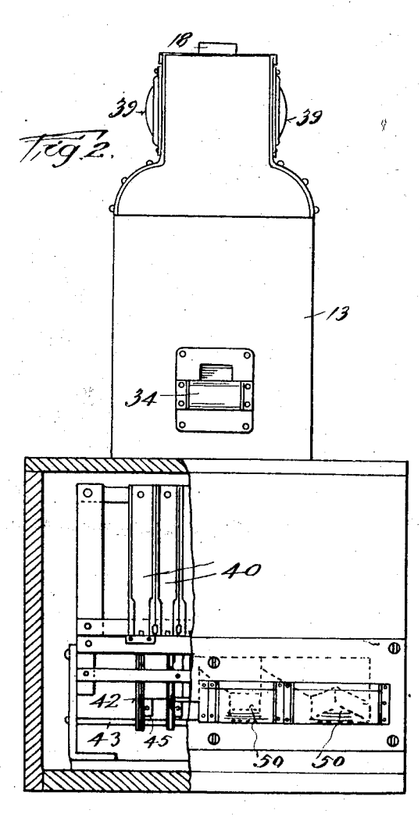
Fig. 2 is an end elevation of the apparatus shown in Fig. 1, with parts broken out to disclose a portion of the ejecting mechanism.

The coins ejected from the racks 40 drop into cups 50, see Figs. 1 and 2, from which they are removed by the depositor.

In the case of a vending machine one of the ejector members 41, of each group will eject the article to be vended while the others will eject the required change.

Figure 12:
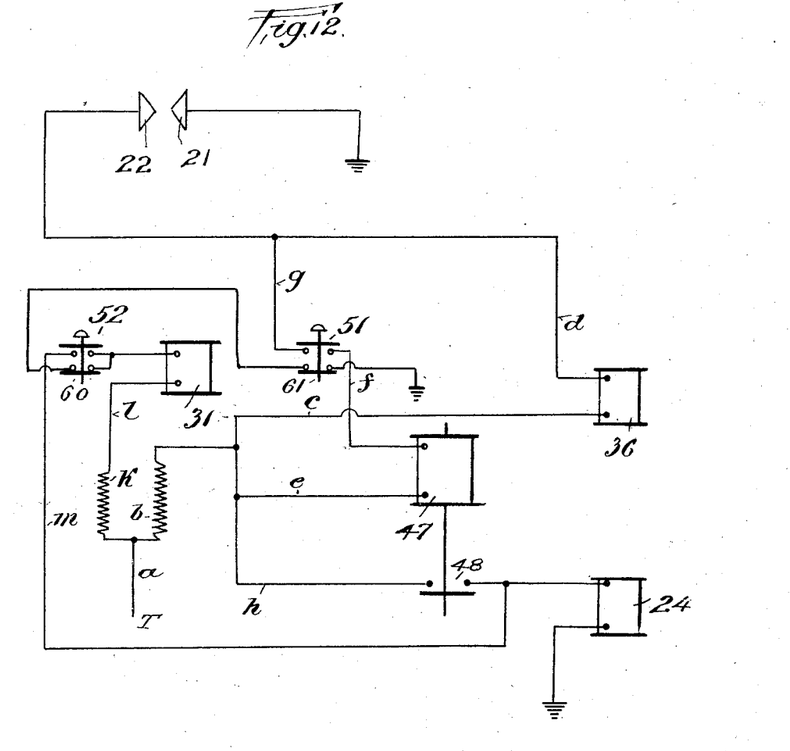
Fig. 12 is a diagram showing the electric circuits.

In Fig. 12 we have shown a simple wiring diagram illustrating the circuit control employed in connection with our invention and for carrying out the operations and controls above indicated. By reference to this diagram it will be seen that when a coin of the required denomination, say, for example, a twenty-five cent piece, is deposited and rests upon its retaining fingers 21, 22, a circuit is completed from trolley or other source, indicated at T, through conductor $a$, resistance $b$, conductor $c$, magnet 36, conductor coin supporting fingers 22, 21 to ground. This results in the stop 35 being projected across the coin receiving slot thereby preventing another coin from being deposited until the previously deposited one has been disposed of. Now the attendant inspects the deposited coin, through the magnifying lens 39. If he finds the deposited coin to be a proper one he then operates a switch 51, which may be a push button, thereby closing the following circuit: from trolley or other current source, through $a$, $b$, $e$, magnet 47, $f$, 51, $g$, 22, 21 to ground. The energization of magnet 47 closes the switch 48, thereby completing a circuit from T, through $a$, $b$, $h$, 48 and magnet 24 to ground. The energization of magnet 47 actuates the change ejector apparatus while the energization of magnet 24 trips the coin retaining finger 22, and releases the coin permitting the same to drop into the receiving receptacle 44. If, however, the attendant discovers upon inspection through the lens that the deposited coin is spurious, or is a slug or the like, or is otherwise improper, then instead of operating the switch 51 he operates a switch 52, thereby completing a circuit from T through $a$, $k$, $l$, magnet 31, 52, $m$, magnet 24 to ground. This results in the release of the coin or slug from its retaining finger 22 and where the baffle is maintained in coin returning position by the energization of magnet 31, which is the illustrative arrangement shown, then the completion of the last mentioned circuit retains the said magnet in energized condition permitting the released coin to be directed into the return chute. Of course, where the baffle member is normally maintained in coin returning position by the spring 30 instead or the energization of magnet 31, then, in such case, operation of the magnet or completion of its energizing circuit is necessary only when switch 51 is operated, as will be readily understood. In order, in the particular illustrative arrangement shown where the baffle member is normally held in coin returning position by the energization of the magnet 31, that said magnet may be constantly energized, we have provided an auxiliary energizing circuit for said magnet through switches 60, 61, respectively controlled by the switches 52, 51. The switches 60, 61, are normally closed and are respectively opened whenever the associated switches 52, 51, one or the other, are operated.

The release of the coin from its retaining finger 22, of course, opens the circuit of magnet 36 and hence the apparatus is ready to receive another coin. We have described the structure and operation involved in connection with the deposit of one coin, but it will be understood that the same description will apply to deposit of the coins of other denominations included within the capacity of the apparatus.

While an apparatus embodying our invention is of convenience and utility in any situation where a change making or a vending or a combined change making and vending apparatus is desired, we have found such apparatus of particular value for use on surface, subway and elevated railways, in making change for passengers' fares without the annoying delays and losses usually encountered in making change by conductors, attendants, or the like. Especially on surface street cars where fares are paid either on entrance or on leaving the car, we have found a change making apparatus of the nature set forth of great convenience to the traveling public, as well as an advantage to the operating company.

Having now set forth the objects and nature of our invention, and a structure embodying the principles thereof, we wish it to be understood that many variations and changes in the details might readily occur to persons skilled in the art without departing from the spirit and scope of our invention. We do not desire, therefore, to be limited or restricted to the exact details shown and described.

But what we claim as new and useful and of our joint invention and desire to secure by Letters Patent is:

1. In a change-making and ejecting apparatus, the combination with ejector devices and manually controlled means to actuate the same of coin receiving and retaining mechanism and means controlled by the actuation of the ejector devices for tripping said receiving and retaining mechanism, said manually controlled means being ineffective to actuate the ejector devices until a coin is deposited in said coin receiving and retaining means.

2. In a change making and ejecting apparatus, a coin deposit chute, supporting devices associated therewith and arranged to receive a deposited coin and retain the same, means to trip said supporting devices to release the coin, change ejecting mechanism and manual means for actuating said ejecting devices, said ejecting mechanism, when actuated, operating said tripping means.

3. In a change making and ejecting apparatus, a coin deposit chute, supporting devices associated therewith and arranged to receive a deposited coin and retain the same, manually controlled means to trip said supporting device to release the coin, and means controlled by a deposited coin to close the coin deposit chute.

4. In a change making and ejecting apparatus, a coin deposit chute, supporting devices associated therewith and arranged to receive a deposited coin and retain the same, manual means to trip said supporting device to release the coin, and means controlled by a deposited coin to close the coin deposit chute, said chute closing means being removed when the deposited coin is released from the supporting and retaining devices.

5. In a change making and ejecting apparatus, separate means for actuating said closure independently of the ejecting apparatus, a coin deposit chute, a closure therefor, coin supporting and retaining devices located below said closure to receive a deposited coin and retain the same, said supporting and retaining devices forming separated contacts in an electric circuit, and electrically operated means arranged in said circuit to operate said closure.

6. In a change making and ejecting apparatus, a coin deposit chute, a closure therefor, coin supporting and retaining devices located below said closure to receive a deposited coin and retain the same, said supporting and retaining devices forming separated contacts in an electric circuit, electrically operated means independent of said ejecting apparatus arranged in said circuit to operate said closure into chute closing position, and means to release the coin from said retaining and supporting devices.

7. In a change making and ejecting apparatus, coin receiving and retaining devices, a chute arranged to receive the coins when released from said devices, a receiving receptacle, and a return chute, a baffle arranged in said chute to direct a released coin into said receptacle or into said chute according to the position of said baffle, means to release the coins from said receiving and retaining devices, and means to position said baffle.

8. In a change making and ejecting apparatus, coin receiving and retaining devices, a chute arranged to receive the coins when released from said devices, a receiving receptacle, and a return chute, a baffle arranged in said chute to direct a released coin into said receptacle or into said chute according to the position of said baffle, means to release the coins from said receiving and retaining devices, means to position said baffle, said baffle being normally maintained in position to direct a released coin into said receptacle, and means to release the coins from said retaining devices.

9. In a change making and ejecting apparatus, coin receiving and retaining devices, a chute arranged to receive the coins when released from said devices, a receiving receptacle, and a return chute, a baffle arranged in said chute to direct a released coin into said receptacle or into said chute according to the position of said baffle, means to release the coins from said receiving and retaining devices, means to position said baffle, means to operate said baffle into position to direct a released coin into said receptacle, means to maintain the baffle in position to direct a released coin into said return chute, and means to coincidently release the coin from said retaining devices.

10. In a change making and ejecting apparatus, coin receiving and retaining devices, a chute arranged to receive the coins when released from said devices, a receiving receptacle, and a return chute, a baffle arranged in said chute to direct a released coin into said receptacle or into said chute according to the position of said baffle, means to release the coins from said receiving and retaining devices, means to position said baffle, means to operate said baffle into position to direct a released coin into said receptacle, means to maintain the baffle in position to direct a released coin into said return chute, and means controlled by said baffle shifting means to release the coin from said retaining devices.

11. In a change making and ejecting apparatus, coin receiving and retaining devices, a chute arranged to receive the coins when released from said devices, a receiving receptacle, and a return chute, a baffle arranged in said chute to direct a released coin into said receptacle or into said chute according to the position of said baffle, manually controlled means to release the coins from said receiving and retaining devices, and independently controlled means to position said baffle.

12. In a change making and ejecting apparatus, coin receiving and retaining devices, a chute arranged to receive the coins when released from said devices, a receiving receptacle, and a return chute, a baffle arranged in said chute to direct a released coin into said receptacle or into said chute according to the position of said baffle, manually controlled means to release the coins from said receiving and retaining devices, and independently controlled means to position said baffle, the control of said baffle positioning means also controlling the release of the coin retaining devices.

13. In a change making and ejecting apparatus, coin receiving and retaining devices, arranged to form spaced apart contacts in an electric circuit, change ejecting means arranged in the circuit of said contacts, and manually operated means in circuit with said ejector means to close said circuit.

14. In a change making and ejecting apparatus, a coin chute, coin retaining devices located below said chute and arranged to form spaced apart contacts in an electric circuit, a closure device for said chute, change ejecting devices, electrical devices to operate said closure and ejecting devices, said electrical devices being arranged in parallel in said circuit.

15. In a change making and ejecting apparatus, a coin chute, coin retaining devices located below said chute and arranged to form spaced apart contacts in an electric circuit, a closure device for said chute, change ejecting devices, electrical devices to operate said closure and ejecting devices, said electrical devices being arranged in parallel in said circuit, and independent means to control the circuit of the ejector operating device.

16. In a change making and ejecting apparatus, a coin chute, coin retaining devices located below said chute and arranged to form spaced apart contacts in an electric circuit, a closure device for said chute, change ejecting devices, electrical devices to operate said closure and ejecting devices, said electrical devices being arranged in parallel in said circuit, independent means to control the circuit of the ejector operating device, and means controlled by the ejector operating device for releasing the coin from said retaining devices.

17. In a change making and ejecting apparatus, coin receiving and retaining devices arranged to form spaced apart contacts in an electric circuit, a receiving receptacle and a return chute, coin deflecting means to direct a coin when released by the retaining devices into the receptacle or the chute according to the position of the deflector, change ejecting devices arranged in the circuit of said contacts, a switch also arranged in said circuit, independent devices to control said coin deflecting means, and a coin releasing means arranged to be controlled by both the ejecting and the deflector actuating devices.

18. In a change making and ejecting apparatus, coin receiving and retaining devices arranged to form spaced apart contacts in an electric circuit, a receiving receptacle and a return chute, coin deflecting means to direct a coin when released by the retaining devices into the receptacle or the chute according to the position of the deflector, change ejecting devices arranged in the circuit of said contacts, a switch also arranged in said circuit, independent devices to control said coin deflecting means, a coin releasing means arranged to be controlled by both the ejecting and the deflector actuating devices, and means also arranged in the circuit of said contacts to prevent the deposit of a coin therebetween until a previously deposited coin has been released.

19. In a change making and ejecting apparatus, coin receiving and retaining devices, change ejecting devices arranged in groups according to the change required for coins of various denominations, and means controlled conjointly by the deposit of a coin to be changed and by manually operated devices, for actuating the corresponding change ejecting devices.

20. In a change making and ejecting apparatus, coin receiving and retaining devices, change ejecting devices arranged in groups according to the change required for coins of various denominations, coin retaining devices associated with each change ejecting group, means controlled by a coin when retained by said coin retaining devices to control the actuation of the associated group of change ejecting devices, and means controlled by the actuation of the change ejecting devices to release the coin from said retaining devices.

21. In a change making and ejecting apparatus, coin receiving and retaining devices, change ejecting devices arranged in groups according to the change required for coins of various denominations, coin retaining devices associated with each change ejecting group, means controlled by a coin when retained by said coin retaining devices to control the actuation of the associated group of change ejecting devices, means controlled by the actuation of the change ejecting devices to release the coin from said retaining devices, and means also controlled by a coin when retained by said coin retaining devices to prevent another coin from reaching said retaining devices until a previously retained coin is released.

22. In a change making and ejecting apparatus, coin receiving and retaining devices, a trip mechanism to return the coin, in combination with means located adjacent said retaining devices to permit a coin retained thereby to be inspected.

23. In a change making and ejecting apparatus, coin receiving and retaining devices, a trip mechanism to return the coin, in combination with a lens located adjacent the coin retaining devices to reveal visually at a distance the character of a coin retained on said retaining devices.

24. In a change making and ejecting apparatus, coin retaining devices, a trip device therefor, a receiving receptacle and a return chute, a baffle member, means to control the baffle member, and means to reveal visually the character of a coin when retained by said retaining devices.

25. In a change making and ejecting apparatus, coin retaining devices, a trip device therefor, a receiving receptacle and a return chute, a baffle member, means to control the baffle member, and a lens positioned opposite said retaining devices to reveal visually at a distance the character of a coin when retained by said retaining devices.

26. In a change making and ejecting apparatus, coin retaining devices, a trip therefor, a receiving receptacle and a return chute, a baffle member to direct a coin, when tripped, into one or the other, change ejecting devices, means to reveal at a distance the character of a coin returned by the retaining devices, and means to independently control the change ejecting devices and the baffle member, said trip being controlled by both the change ejecting and the baffle operating devices.

27. In a change making and ejecting apparatus, coin retaining devices, a trip therefor, a receiving receptacle and a return chute, a baffle member to direct a coin, when tripped, into one or the other, change ejecting devices, means to reveal at a distance the character of a coin returned by the retaining devices, means to independently control the change ejecting devices and the baffle member, said trip being controlled by both the change ejecting and the baffle operating devices, and means operating when a coin is retained on said retaining devices to prevent access thereto of another coin until a previously retained coin is tripped.

In testimony whereof we have hereunto set our hands on this 30th day of July A. D., 1923.

FRANK HEDLEY.
JAMES S. DOYLE.